US012516795B2

(12) United States Patent
Wang et al.

(10) Patent No.: US 12,516,795 B2
(45) Date of Patent: Jan. 6, 2026

(54) LIGHT PLATE AND DISPLAY DEVICE

(71) Applicant: HKC CORPORATION LIMITED, Shenzhen (CN)

(72) Inventors: Hongsong Wang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/086,191

(22) Filed: Mar. 21, 2025

(65) Prior Publication Data

US 2025/0305661 A1 Oct. 2, 2025

(30) Foreign Application Priority Data

Apr. 2, 2024 (CN) ......................... 202410390119.8

(51) Int. Cl.
*F21V 19/00* (2006.01)
*F21Y 115/10* (2016.01)

(52) U.S. Cl.
CPC ....... *F21V 19/0015* (2013.01); *F21Y 2115/10* (2016.08)

(58) Field of Classification Search
CPC .................. F21V 19/00–0055; F21Y 2115/10
See application file for complete search history.

(56) References Cited

U.S. PATENT DOCUMENTS

2024/0205612 A1* 6/2024 Sung ...................... H04R 17/00

* cited by examiner

*Primary Examiner* — Jason M Han

(57) ABSTRACT

A light plate and a display device are disclosed. The light plate includes a bottom plate, a vibration fitting assembly, multiple light-emitting elements, and a retaining assembly. The retaining assembly includes a guide piece, a blocking piece, a first elastic piece, and a shaking structure. The bottom plate includes a guide slot. The guide piece is fixedly arranged at a periphery of the bottom plate. The guide piece includes a first slide groove in one side facing a center of the bottom plate. The blocking piece includes a slider and a guide rod. The slider is slidably fitted with the first slide groove. The first elastic piece is disposed in the guide slot. The guide rod extends into the guide slot and abuts against the first elastic piece. The shaking structure is disposed between the blocking piece and the bottom plate.

20 Claims, 10 Drawing Sheets

LIGHT PLATE AND DISPLAY DEVICE

CROSS-REFERENCE TO RELATED APPLICATIONS

This application claims the priority and benefit of Chinese patent application number 2024103901198, titled "Light Plate and Display Device" and filed Apr. 2, 2024 with China National Intellectual Property Administration, the entire contents of which are incorporated herein by reference.

TECHNICAL FIELD

This application relates to the field of display technology, and more particularly relates to a light plate and display device.

BACKGROUND

The description provided in this section is intended for the mere purpose of providing background information related to the present application but doesn't necessarily constitute prior art.

With the innovation and development of LED (light-emitting diode) technology, Micro-LED (Micro Light Emitting Diode) display technology has become a new generation of display technology. It consists in miniaturizing and matrixing the LED structure, so that the size of a single LED chip is reduced to tens of microns or even a few microns, and each LED pixel can be addressed and driven to emit light independently. Since the display having Micro-LED chips has the advantages of high resolution, high brightness, long life, wide operating temperature range, strong anti-interference ability, fast response speed, and low power consumption, Micro-LED has important application values in high-resolution display, helmet display, enhanced display, high-speed visible light communication, micro projector, optogenetics, and wearable electronics.

A full-color gamut Micro-LED display is composed of Micro-LED chips in three primary colors of red, green, and blue (RGB) assembled on a substrate in a certain arrangement. Each RGB group may use three chips of red, green, and blue that are evenly spaced in a horizontal plane to form an RGB effect. The size of a single group is relatively large, and it is also difficult to assemble. The red, green, and blue chips need to be arranged in sequence, so that the number of chips to be mass transferred is large, resulting in relatively high requirements for the mass transfer process of Micro-LEDs and problems of low mass transfer efficiency, and poor accuracy. Currently, Micro-LED chips can be assembled by vibration, but when vibrating, the Micro-LED chips are very likely to jump out of the substrate due to an excessive vibration amplitude, resulting in failure of successful installation of the Micro-LED chips.

SUMMARY

It is therefore one purpose of the present application to provide a light plate and a display device, which prevent a light-emitting elements from jumping out of a substrate due to an excessive vibration amplitude during assembly by setting a blocking structure on the light plate, which may otherwise cause the light-emitting element to fail to be installed successfully.

In some embodiments, the light plate further includes a support plate. The support plate is arranged on the second region. The support plate is located between the vibration plate and the bottom plate. A groove is disposed in the bottom plate. The vibrator is arranged in the groove. The vibration plate is gradually thinned stepwise from the first region to the second region. The support plate is gradually thickened stepwise from the first region to the second region. The vibration plate is arranged to cooperate with the support plate. The shaking structure includes a first shaking piece, a second shaking piece, a bearing piece, a second elastic piece, a third elastic piece, and two telescopic pieces arranged opposite to each other about a light emitting direction of the light plate. The telescopic piece includes a main body and an extension piece. One end of the main body abuts against the bottom plate, and the other end abuts against the blocking piece. The extension piece is arranged on the side of the main body facing away from the guide rod. A second slide groove is disposed in the main body. A third slide groove is disposed in the extension piece. The first shaking piece and the second shaking piece are arranged between the two telescopic pieces. The first shaking piece is arranged near the bottom plate and is slidably arranged with the second slide groove. One end of the second elastic piece abuts against the bottom plate, and the other end abuts against the first shaking piece. The second shaking piece is arranged near the blocking piece and is slidably arranged with the third slide groove. One end of the third elastic piece abuts against the extension piece, and the other end abuts against the second shaking piece. The bearing piece is arranged on the end of the second shaking piece facing away from the first shaking piece. The end of the bearing piece facing away from the second shaking piece abuts against the blocking piece. A vibration transmission medium is disposed between the first shaking piece and the second shaking piece. When the vibrator is started, the first shaking piece vibrates to drive the second shaking piece to vibrate, so that the bearing piece drives the blocking piece to vibrate.

In some embodiments, the light plate further includes a support plate, which is arranged on the second region. The support plate is located between the vibration plate and the bottom plate. A groove is disposed in the bottom plate, and the vibration unit is arranged in the groove. The vibration plate is gradually thinned stepwise along the direction from the first region to the second region. The support plate is gradually thickened stepwise along the direction from the first region to the second region. The vibration plate is arranged in cooperation with the support plate. The shaking structure includes a first shaking piece, a second shaking piece, a bearing piece, a second elastic piece, a third elastic piece, and two telescopic pieces arranged opposite to each other about a light emitting direction of the light plate. The telescopic piece includes a main body and an extension piece. One end of the main body abuts against the bottom plate, and the other end abuts against the blocking piece. The extension piece is arranged on the side of the main body facing away from the guide rod. A second slide groove is arranged in the main body. A third slide groove is arranged in the extension piece. The first shaking piece and the second shaking piece are arranged between the two telescopic pieces. The first shaking piece is arranged near the bottom plate and is slidably fitted with the second slide groove. One end of the second elastic piece abuts against the bottom plate, and the other end abuts against the first shaking piece. The second shaking piece is arranged near the blocking piece and is slidably fitted with the third slide groove. One end of the third elastic piece abuts against the extension piece, and the other end abuts against the second shaking piece. The bearing piece is arranged on the end of the second shaking piece facing away from the first shaking piece. The end of the bearing piece facing away from the second shaking piece abuts against the blocking piece. A vibration transmission medium is disposed between the first shaking piece and the second shaking piece. When the vibrator is started, the first shaking piece vibrates, and the second shaking piece is driven to vibrate, so that the bearing piece drives the blocking piece to vibrate.

In some embodiments, a density of the first shaking piece is equal to a density of the area of the vibration plate adjacent to the guide piece, so that the vibration frequency of the first shaking piece is the same as the vibration frequency of the area of the vibration plate adjacent to the blocking piece.

In some embodiments, a first receiving slot is disposed in the bottom plate. A fourth elastic piece is disposed in the first receiving slot. The shaking structure further includes a third shaking piece, which is disposed in the first receiving slot. One end of the fourth elastic piece abuts against a bottom of the first receiving slot, and the other end abuts against the end of the third shaking piece facing away from the blocking piece. A matching piece is disposed on the end of the first shaking piece facing away from the second shaking piece. An engaging piece matching the matching piece is disposed on the end of the third shaking piece adjacent to the blocking piece. When the blocking piece moves toward the bottom plate until the matching piece is engaged with the engaging piece, the first shaking piece, the second shaking piece, and the third shaking piece all stop vibrating.

In some embodiments, a first sealing piece is disposed on one end of the first shaking piece adjacent to the main body. A second sealing piece is disposed on one end of the second shaking piece adjacent to the extension piece. The first sealing piece and the second sealing piece are used to seal the vibration transmission medium between the first shaking piece and the second shaking piece.

In some embodiments, the bearing piece includes a fixing piece and branches. The fixing piece is fixedly connected to the second shaking piece. One end of each branch is connected to the fixing piece, and the other end is abutted against the blocking piece. The branches are triangular in shape to support the blocking piece.

In some embodiments, an area of the first shaking piece is greater than an area of the second shaking piece.

In some embodiments, the light plate further includes a glass cover arranged on a side of the blocking piece facing away from the bottom plate.

In some embodiments, the vibration transmission medium is a gas, which is carbon dioxide.

The present application further discloses a display device, including a driving circuit and a display panel. The display panel includes the light plate as described above. The driving circuit drives the display panel.

When installing the light-emitting elements, the light plate of this application can realize the automatic assembly of the light-emitting elements through the structure of the light plate itself. That is, the vibrator drives the light-emitting elements to resonate so that the light-emitting elements gradually adjust their positions to be installed at the designated positions, thereby reducing the accuracy required when transferring the light-emitting elements to the light plate in large quantities, thereby reducing the requirements of the Micro-LED mass transfer process. Furthermore, there is no need to use manpower to install the Micro-LED chips, and the installation efficiency is high and the installation is accurate. During the installation process, the outermost light-emitting elements on the vibration plate will vibrate along with the vibration frequency of the vibration plate due to the action of the shaking structure. That is, the blocking piece will vibrate along with the vibration of the light-emitting elements, so that the light-emitting elements will be blocked by the blocking piece, so as to prevent the light-emitting elements from jumping out of the vibration plate due to a relatively large vibration amplitude during the vibration process, and reduce the occurrence of the light-emitting element failing to be installed successfully.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principles of the present application in conjunction with the text description. Apparently, the drawings in the following description merely represent some embodiments of the present disclosure, and for those having ordinary skill in the art, other drawings may also be obtained based on these drawings without investing creative. In the drawings.

Figure 1:
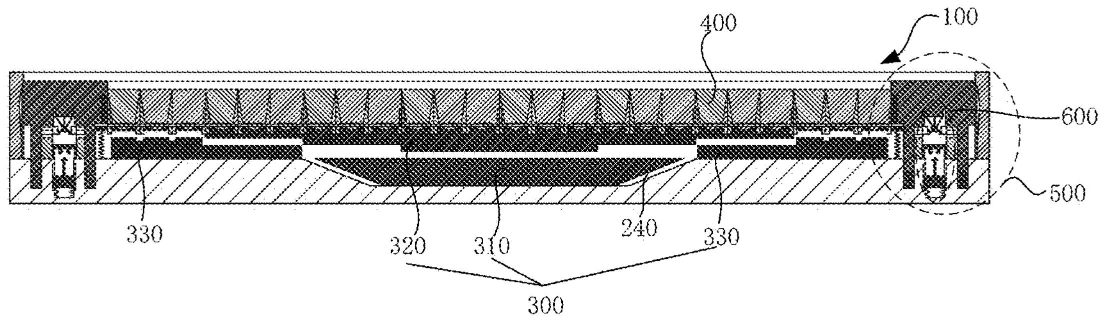
FIG. 1 is a schematic cross-sectional view of a light plate of a first embodiment of the present application.
Figure 2:
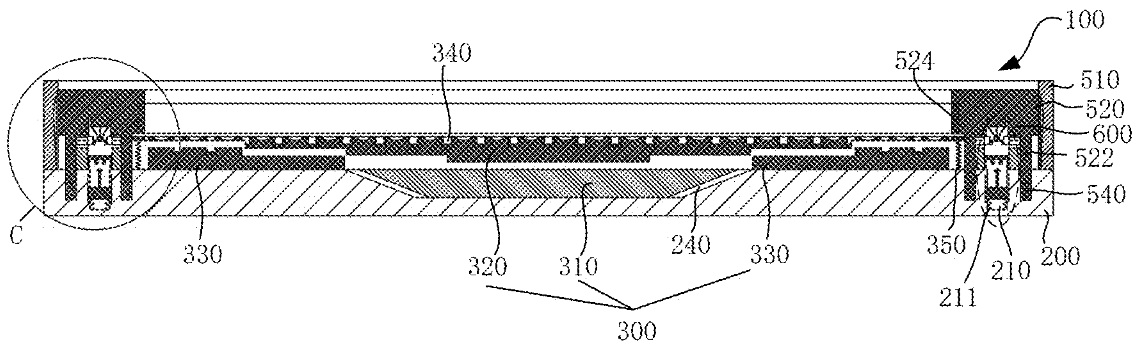
FIG. 2 is a schematic cross-sectional view of a light plate of a second embodiment of the present application after removing a light-emitting element.
Figure 3:
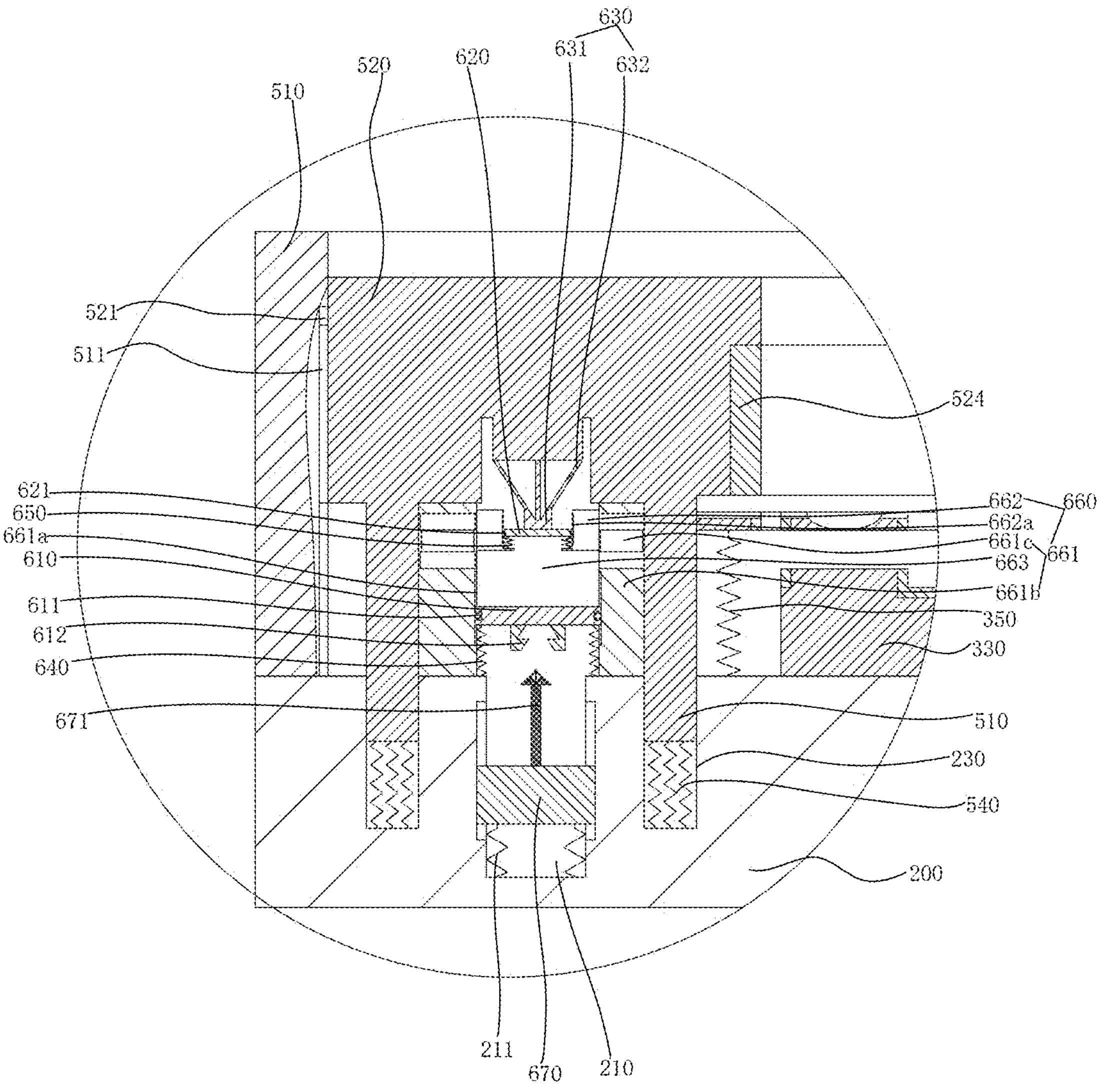
FIG. 3 is an enlarged view of portion C shown in FIG. 2 of the present application.

In the drawings: 100, light plate; 110, glass cover; 200, bottom plate; 210, first receiving slot; 211, fourth elastic piece; 230, guide slot; 240, groove; 300, vibration fitting assembly; 310, vibrator; 320, vibration plate; 330, support plate; 340, installation slot; 341, first positioning slot; 342, second positioning slot; 343, third positioning slot; 344, fourth positioning slot; 345, fifth positioning slot; 346, sixth positioning slot; 350, supporting elastic piece; 400, light-emitting element; 410, positioning structure; 420, first light-emitting chip; 421, first positioning piece; 422, first conductive electrode; 430, second light-emitting chip; 431, second positioning piece; 432, second conductive electrode; 440, third light-emitting chip; 441, third positioning piece; 442, third conductive electrode; 450, first positioning magnet; 460, second positioning magnet; 500, retaining assembly; 510, guide piece; 511, first slide groove; 520, blocking piece; 521, slider; 522, guide rod; 523, fixing shaft; 524, third positioning magnet; 530, displacement structure; 531, torsion spring; 532, rotating shaft; 533, winding belt; 540, first elastic piece; 600, shaking structure; 610, first shaking piece; 611, first sealing piece; 612, matching piece; 620, second shaking piece; 621, second sealing piece; 630, bearing piece; 631, fixing piece; 632, branch; 640, second elastic piece; 650, third elastic piece; 660, telescopic piece; 661, main body; 661*a*, second slide groove; 661*b*, first fixing piece; 661*c*, first telescopic piece; 662, extension piece; 662*a*, third slide groove; 663, vibration transmission medium; 670, third shaking piece; 671, engaging piece; 700, driving circuit; 800, display panel; 900, display device.

DETAILED DESCRIPTION OF EMBODIMENTS

It should be understood that the terms used herein, the specific structures and functional details disclosed therein are merely representative for describing some specific embodiments, but the present application can be implemented in many alternative forms and should not be construed as being limited to only these embodiments described herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Terms "comprise", "comprising", "includes", "including", and any variations thereof are intended to be non-exclusive, and one or more other features, integers, steps, operations, units, components, and/or combinations thereof may be present or be added.

In addition, terms "center" "lateral", "up", "down", "left", "right", "vertical", and "horizontal", "top", "bottom", "inside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

In addition, unless otherwise clearly specified and defined, the terms "installed on", "disposed on", "arranged on", and "connected to" should be understood in a broad sense. For example, it may be a fixed connection, a detachable connection, or an integral connection; it may be a mechanical connection or an electrical connection; it may be a direct connection or an indirect connection through an intermediate medium, or it may be internal communication between two elements. For those of ordinary skill in the art, the specific meanings of the above terms as used in the present application can be understood depending on specific contexts.

The present application is described in detail below with reference to the accompanying drawings and optional embodiments. It should be noted that, under the premise of no conflict, the embodiments or technical features described below can be arbitrarily combined to form new embodiments.

As shown in FIG. 1, as a first embodiment of the present application, a light plate 100 is disclosed, which is applied to a display device. The display device is a Micro-LED display device. The light plate 100 includes a bottom plate 200, a vibration fitting assembly 300, a plurality of light-emitting elements 400, and a retaining assembly 500. The bottom plate 200 includes a first region located at a center and a second region located at an edge. The second region is arranged to surround the first region. The vibration fitting assembly 300 includes a vibrator 310, a vibration plate 320, and a plurality of supporting elastic pieces 350. The vibrator 310 is arranged in the first region. The plurality of supporting elastic pieces 350 are arranged in the second region. The vibration plate 320 is arranged on the side of the vibrator 310 facing away from the bottom plate 200. The vibration plate 320 abuts against the plurality of supporting elastic pieces 350. The vibration plate 320 includes a plurality of installation slots 340. Each of the light-emitting elements 400 includes a positioning structure 410 matching a group of the installation slots 340. The light-emitting element 400 is installed in the installation slot 340 through the positioning structure 410. The retaining assembly 500 is arranged in the second region. The retaining assembly 500 includes a guide piece 510, a blocking piece 520, a first elastic piece 540, and a shaking structure 600. The bottom plate 200 includes a guide slot 230. The guide piece 510 is fixing to a periphery of the bottom plate 200. A first slide groove 511 is defined in the side of the guide piece 510 facing towards the center of the bottom plate 200. A slider 521 and a guide rod 522 are disposed on the blocking piece 520. The slider 521 operates in cooperation with the first slide groove 511. The first elastic piece 540 is disposed in the guide slot 230. The guide rod 522 extends into the guide slot 230 and abuts against the first elastic piece 540. The shaking structure 600 is disposed between the blocking piece 520 and the bottom plate 200. When the light-emitting elements 400 are laid on the vibration plate 320, the vibrator 310 is started to drive the vibration plate 320 to vibrate, thereby shaking the light-emitting elements 400. The vibration frequency of a light-emitting element 400 located on the vibration plate 320 near the second region is greater than the vibration frequency of a light-emitting element 400 located on the vibration plate 320 near the first region. The shaking structure 600 drives the blocking piece 520 to vibrate along with the vibration frequency of the vibration plate 320. When installing the light-emitting elements 400, the light plate 100 of this embodiment can first lay the light-emitting elements 400 on the vibration plate 320. The light-emitting elements 400 can be laid on the vibration plate 320 at will, without considering the arrangement of the light-emitting elements 400 and whether there is overlap therebetween. Then, the vibrator

310 is started, and the vibrator 310 drives the vibration plate 320 to vibrate, and the light-emitting elements 400 laid on the vibration plate 320 will vibrate together with the vibration plate 320, so that the light-emitting elements 400 can shake on the vibration plate 320 to gradually adjust their positions until the positioning structure 410 of each light-emitting element 400 is fitted with the respective installation slot 340 in the vibration plate 320, thereby completing the installation of the light-emitting elements 400. During the operation of the vibrator 310, the blocking piece 520 will vibrate along with the vibration frequency of the vibration plate 320 under the action of the shaking structure 600, so that the blocking piece 520 will vibrate with the vibration of the light-emitting elements 400. That is, when the light-emitting elements 400 near the blocking piece 520 move in a direction away from the bottom plate 200 due to vibration, the blocking piece 520 will also move in a direction away from the bottom plate 200 to block the light-emitting elements 400, so that the light-emitting elements 400 near the periphery of the vibration plate 320 will not jump out of the vibration plate 320 due to vibration. Instead, they will be blocked by the blocking piece 520 to avoid the situation where the light-emitting elements 400 cannot be installed successfully.

When installing the light-emitting elements 400, the light plate 100 of this embodiment can realize the automatic assembly of the light-emitting elements 400 through the structure of the light plate 100 itself. That is, the vibrator 310 drives the light-emitting elements 400 to resonate so that the light-emitting elements 400 gradually adjust their positions to be installed at the designated positions, thereby reducing the accuracy required when transferring the light-emitting elements 400 to the light plate 100 in large quantities, thereby reducing the requirements of the Micro-LED mass transfer process. Furthermore, there is no need to use manpower to install the Micro-LED chips, and the installation efficiency is high and the installation is accurate. During the installation process, the outermost light-emitting elements 400 on the vibration plate 320 will vibrate along with the vibration frequency of the vibration plate 320 due to the action of the shaking structure 600. That is, the blocking piece 520 will vibrate along with the vibration of the light-emitting elements 400, so that the light-emitting elements 400 will be blocked by the blocking piece 520, so as to prevent the light-emitting elements 400 from jumping out of the vibration plate 320 due to a relatively large vibration amplitude during the vibration process, and reduce the occurrence of the light-emitting element 400 failing to be installed successfully. In this embodiment, the vibrator 310 may be a sound unit. When assembling the light-emitting elements 400, the sound unit operations from a small frequency to a large frequency, so that the vibration plate 320 and the light-emitting elements 400 resonate, so that the light-emitting elements 400 gradually adjusts their positions on the vibration plate 320 until the installation is completed. The sound unit can achieve precise and quantitative sound frequency to control the power density spectrum of the vibration, thereby controlling the vibration frequency in order to to control the changes of the vibration frequencies of the light-emitting elements 400 at different positions. The supporting elastic piece 350 elastically supports the vibration plate 320, so that the vibration plate 320 and the vibrator 310 are spaced apart to avoid direct contact. It can be understood that the installation slot 340 may include a power circuit for powering up the respective light-emitting element 400 to provide power to the light-emitting element 400.

Figure 4:
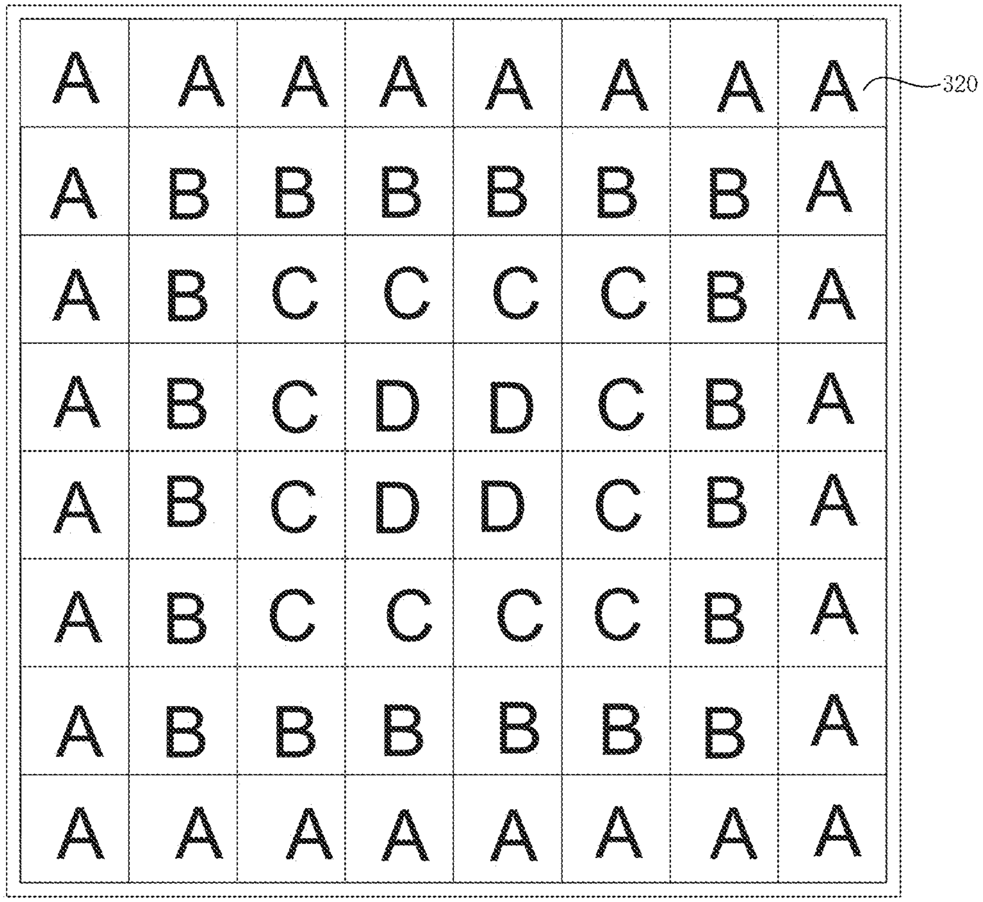
FIG. 4 is a schematic view of a vibration plate of the second embodiment of the present application.
Figure 5:
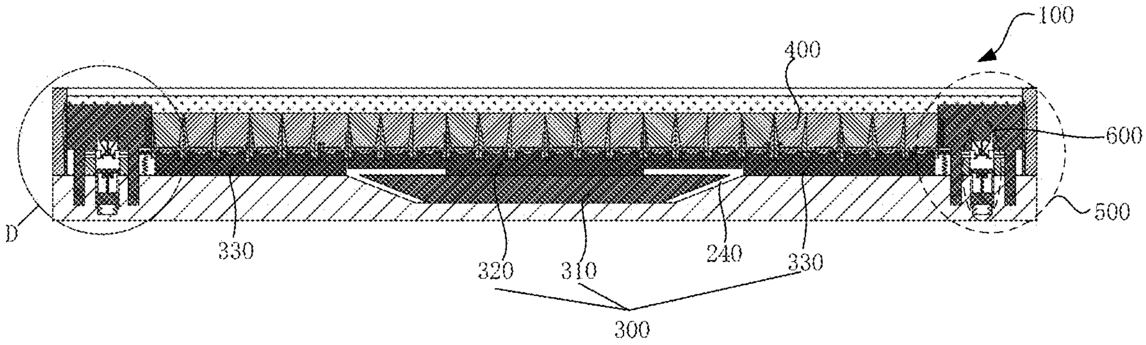
FIG. 5 is a schematic cross-sectional view of a light plate of the second embodiment of the present application after assembly.

As shown in FIGS. 2 to 6, as the second embodiment of the present application, which is a further refinement of the first embodiment of the present application, a light plate 100 is disclosed. The light plate 100 further includes a support plate 330. The support plate 330 is arranged in the second region. The support plate 330 is arranged between the vibration plate 320 and the bottom plate 200. A groove 240 is disposed in the bottom plate 200. The vibrator 310 is arranged in the groove 240. The vibration plate 320 is gradually thinned stepwise along the direction from the first region to the second region. The support plate 330 is gradually thickened stepwise along the direction from the first region to the second region. The vibration plate 320 is arranged in cooperation with the support plate 330. The vibration plate 320 is divided into areas with different vibration frequencies. The vibration plate 320 is arranged to be gradually thinned stepwise along the direction from the first region to the second region, and the areas of the vibration plate 320 with different thicknesses have different vibration frequencies when vibrating. As shown in FIG. 4, the vibration frequency distribution on the vibration plate 320 is distributed in a descending order from A-D in the direction from the edge to the center, that is, the vibration plate 320 is divided into four areas A, B, C, and D. The following will explain the area A, area B, area C, and area D as examples. At the same time, the support plate 330 corresponding to the vibration plate 320 is arranged to be gradually thickened stepwise along the direction from the first region to the second region. In this way, after the light-emitting elements 400 are installed, when the vibration plate 320 is fitted with the support plate 330, the light-emitting elements 400 disposed on the vibration plate 320 can be located at the same height. Furthermore, the support plate 330 may support the thinned areas of the vibration plate 320 so that the vibration plate 320 will not break up. When assembling the light-emitting elements 400, when the vibrator 310 is started to drive the light-emitting elements 400 on the vibration plate 320 to vibrate, the vibration frequencies at different thickness positions on the vibration plate 320 are different. The vibration frequency of a thinner area of the vibration plate 320 (i.e., the outer area of the vibration plate 320) is higher than the vibration frequency of a thicker area of the vibration plate 320 (i.e., the central area of the vibration plate 320). That is, the movement amplitude of a peripheral light-emitting element 400 is greater than the movement amplitude of a central light-emitting element 400, so that the light-emitting elements 400 set on the vibration plate 320 are gradually assembled in the direction from the periphery to the center during assembly.

The shaking structure 600 includes a first shaking piece 610, a second shaking piece 620, a bearing piece 630, a second elastic piece 640, a third elastic piece 650, and two telescopic pieces 660 arranged opposite to each other about a light emitting direction of the light plate 100. The telescopic piece 660 includes a main body 661 and an extension piece 662. One end of the main body 661 abuts against the bottom plate 200, and the other end abuts against the blocking piece 520. The extension piece 662 is arranged on the side of the main body 661 facing away from the guide rod 522. A second slide groove **661*a* is arranged in the main body 661. A third slide groove 662*a* is arranged in the extension piece 662. The first shaking piece 610 and the second shaking piece 620 are arranged between the two telescopic pieces 660. The first shaking piece 610 is arranged near the bottom plate 200 and is slidably fitted with the second slide groove 661*a*. One end of the second elastic piece 640 abuts against the bottom plate 200, and the other end abuts against the first shaking piece 610. The second shaking piece 620 is arranged near the blocking piece 520 and is slidably fitted with the third slide groove 662***a*. One end of the third elastic piece 650 abuts against the extension piece 662, and the other end abuts against the second shaking piece 620. The bearing piece 630 is arranged on the end of the second shaking piece 620 facing away from the first shaking piece 610. The end of the bearing piece 630 facing away from the second shaking piece 620 abuts against the blocking piece 520. A vibration transmission medium 663 is disposed between the first shaking piece 610 and the second shaking piece 620. When the vibrator 310 is started, the first shaking piece 610 vibrates, and the second shaking piece 620 is driven to vibrate through the vibration transmission medium 663, so that the bearing piece 630 drives the blocking piece 520 to vibrate.

In the light plate 100 of this embodiment, when the light-emitting elements 400 are installed, after the vibrator 310 is started, the first shaking piece 610 will vibrate with the start of the vibrator 310. That is, the first shaking piece 610 slides up and down in the second slide groove 661*a*. The first shaking piece 610 will drive the second shaking piece 620 to vibrate through the vibration transmission medium 663, so that the second shaking piece 620 slides up and down in the third slide groove 662*a*. At this time, the bearing piece 630 arranged on the end of the second shaking piece 620 facing away from the first shaking piece 610 supports the blocking piece 520 to slide up and down in the first slide groove 511 under the action of the second shaking piece 620, so that the blocking piece 520 can vibrate with the vibration of the light-emitting elements 400, thereby blocking the light-emitting elements 400 on the vibration plate 320, and preventing the light-emitting elements 400 from jumping out of the vibration plate 320 due to the shaking, resulting in the light-emitting elements 400 failing to be installed successfully. In this embodiment, the second elastic piece 640 and the third elastic piece 650 may be compression springs. The vibration transmission medium 663 may be a gas. The gas may be carbon dioxide or other incompressible gases. Designers can choose the design depending on actual conditions, and only need to meet the requirements that the gas is an incompressible gas for the first shaking piece 610 and the second shaking piece 620. In addition, in order to prevent the gas as the vibration transmission medium 663 from leaking, the first shaking piece 610 is provided with a first sealing piece 611 on one end close to the main body 661, and the second shaking piece 620 is provided with a second sealing piece 621 on one end close to the extension piece 662. The first sealing piece 611 and the second sealing piece 621 enable the vibration transmission medium 663 to be sealed between the first shaking piece 610 and the second shaking piece 620. It should be noted that the first sealing piece 611 and the second sealing piece 621 may be sealing gaskets or other sealing devices, and designers can make choices or designs depending on actual conditions.

Further, the density of the first shaking piece 610 is equal to the density of the area of the vibration plate 320 close to the guide piece 510. The thickness of the first shaking piece 610 is equal to the thickness of the area of the vibration plate 320 close to the guide piece 510. That is, the density and thickness of the first shaking piece 610 are equal to the density and thickness of the area A on the vibration plate 320, so that the vibration frequency of the first shaking piece 610 is the same as the vibration frequency of the area of the vibration plate 320 close to the blocking piece 520. In this way, the shaking frequency of the light-emitting element 400 located on the area A of the vibration plate 320 is the same as the shaking frequency of the first shaking piece 610, so that the shaking frequency of the blocking piece 520 is close to the shaking frequency of the light-emitting element 400 on the area A of the vibration plate 320. The blocking piece 520 will vibrate along with the shaking of the light-emitting element 400, so that the light-emitting element 400 will be blocked by the blocking piece 520, so as to prevent the light-emitting element 400 from jumping out of the vibration plate 320 area due to the large shaking amplitude during the shaking process, and reduce the occurrence of the light-emitting element 400 failing to be installed successfully. In order to make the shaking frequency of the blocking piece 520 closer to the shaking frequency of the light-emitting element 400 on the area A of the vibration plate 320, the area of the first shaking piece 610 is larger than the area of the second shaking piece 620. As such, When the first shaking piece 610 is vibrated, it is easier to vibrate the second shaking piece 620 through the vibration transmission medium 663. That is, the shaking frequency of the second shaking piece 620 is increased, so that the shaking frequency of the blocking piece 520 is increased to a certain extent.

Further, the bearing piece 630 includes a fixing piece 631 and branches 632. The fixing piece 631 is fixedly connected to the second shaking piece 620. One end of each branch 632 is connected to the fixing piece 631, and the other end is abutted against the blocking piece 520. The branches 632 are triangular in shape to support the blocking piece 520, so that when the second shaking piece 620 slides toward the blocking piece 520, the thrust created by the second shaking piece 620 on the blocking piece 520 can be dispersed to the blocking piece 520 through the branches 632 of the bearing piece 630, so that the blocking piece 520 can slide smoothly in the first slide groove 511. The main body 661 includes a first fixing piece 661*b* and a first telescopic piece 661*c*. The first fixing piece 661*b* is arranged near the bottom plate 200 and abuts against the bottom plate 200. The first telescopic piece 661*c* is arranged near the blocking piece 520 and abuts against the blocking piece 520. The extension piece 662 is arranged on one side of the first telescopic piece 661*c*. The first telescopic piece 661*c* is retractable. When the retractable part is retracted, the extension piece 662 moves toward the bottom plate 200. When the first telescopic piece 661*c* is extended, the extension piece 662 moves toward the blocking piece 520. The first telescopic piece 661*c* is initially in an extended state. The first telescopic piece 661*c* may be a telescopic cylinder, so that when the first telescopic piece 661*c* is contracted, the overall height of the first telescopic piece 661*c* is reduced and contracted into its own structure.

Figure 6:
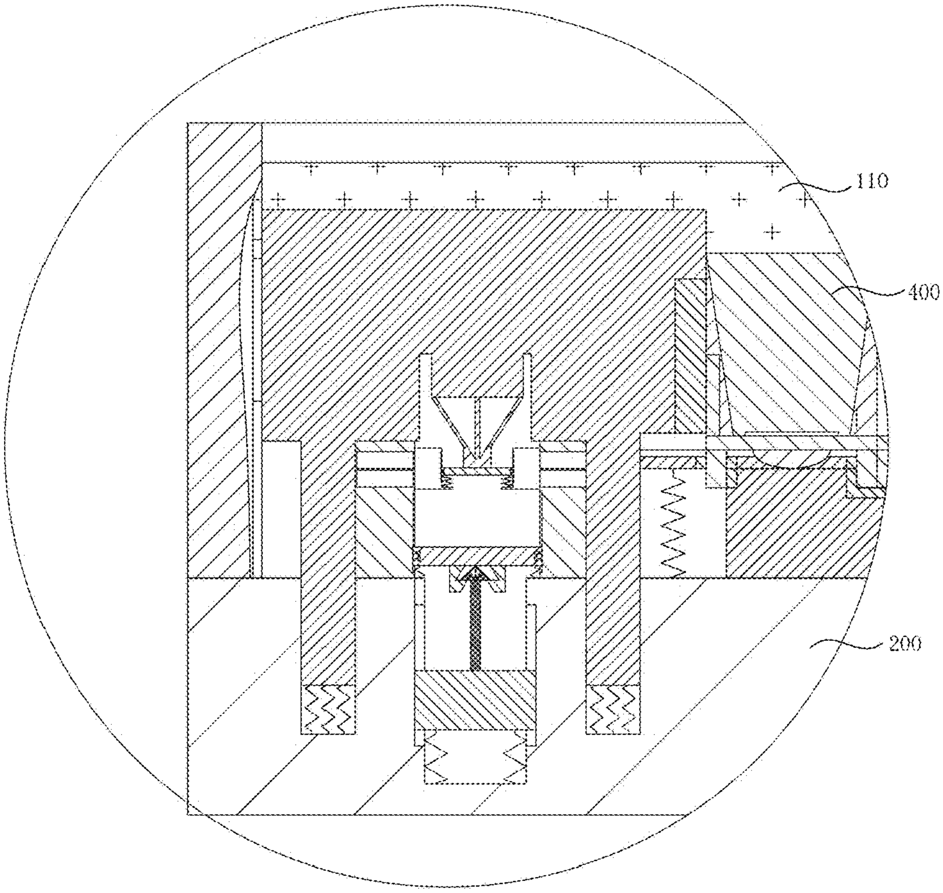
FIG. 6 is an enlarged view of portion D shown in FIG. 5 of the present application.

A first receiving slot 210 is disposed in the bottom plate 200. A fourth elastic piece 211 is disposed in the first receiving slot 210. The shaking structure 600 further includes a third shaking piece 670, which is disposed in the first receiving slot 210. One end of the fourth elastic piece 211 abuts against the bottom of the first receiving slot 210, and the other end abuts against the end of the third shaking piece 670 facing away from the blocking piece 520. A matching piece 612 is disposed on one end of the first shaking piece 610 facing away from the second shaking piece 620. An engaging piece 671 matching the matching piece 612 is disposed on an end of the third shaking piece 670 close to the blocking piece 520. When assembling the light-emitting elements 400, the light plate 100 of this embodiment first lays the light-emitting elements 400 on the vibration plate 320. Then the vibrator 310 is started. The vibrator 310 operates to vibrate the light-emitting elements 400 on the vibration plate 320 to gradually adjust their positions. Among them, the light-emitting elements 400 located on the A area of the vibration plate 320 has a higher shaking frequency, so that the light-emitting elements 400 on this area can be assembled on the vibration plate 320 first. During this process, the first shaking piece 610 will vibrate following the vibration frequency of the A region of the vibration plate 320, and drive the second shaking piece 620 to vibrate through the vibration transmission medium 663, so that the bearing piece 630 drives the blocking piece 520 to vibrate, so that when the light-emitting elements 400 located on the A area of the vibration plate 320 are assembled, even if the vibration frequency of the light-emitting elements 400 on the A area is high, the light-emitting elements 400 will not jump out of the vibration plate 320. When the light-emitting elements 400 on the A area of the vibration plate 320 are installed, the blocking piece 520 carries the weight of the light-emitting elements 400 in the A area, so that the weight that the bearing piece 630 needs to bear increases, and the second shaking piece 620 will move toward the bottom plate 200. Through the transmission of the vibration transmission medium 663, the first shaking piece 610 will also move toward the bottom plate 200. Furthermore, the first telescopic piece 661*c* of the telescopic piece 660 will also be converted from the telescopic state to the contracted state. The third shaking piece 670 will vibrate following the vibration of the vibrator 310. That is, the third shaking piece 670 will slide in the first receiving slot 210. When the first shaking piece 610 moves toward the bottom plate 200 and the third shaking piece 670 moves toward the blocking piece 520, the engaging piece 671 of the third shaking piece 670 will be engaged with the matching piece 612 on the first shaking piece 610, so that the first shaking piece 610 and the third shaking piece 670 are fixed together. As such, the third shaking piece 670 carries the weight of the light-emitting elements 400 in the A area and the weights of the blocking piece 520, the first shaking piece 610, and the second shaking piece 620. At this time, the third shaking piece 670 stops vibrating; that is, the first shaking piece 610, the second shaking piece 620, and the third shaking piece 670 all stop vibrating. The density and thickness of the third shaking piece 670 may be the same as the density and thickness of the B area on the vibration plate 320, so that when the first shaking piece 610 slides toward the bottom plate 200, the third shaking piece 670 may slide along with the vibration frequency of the B area of the vibration plate 320. In this embodiment, the engaging piece 671 may be a buckle, and the matching piece 612 may be a hook structure matching the buckle, as shown in FIG. 6, so that when the buckle is snapped into the hook structure, the buckle is not easy to be separated from the hook structure, ensuring the connection stability between the third shaking piece 670 and the first shaking piece 610. Of course, designers may also choose to design the engaging piece 671 and the matching piece 612 depending on actual conditions, and there is no restriction here.

Figure 7:
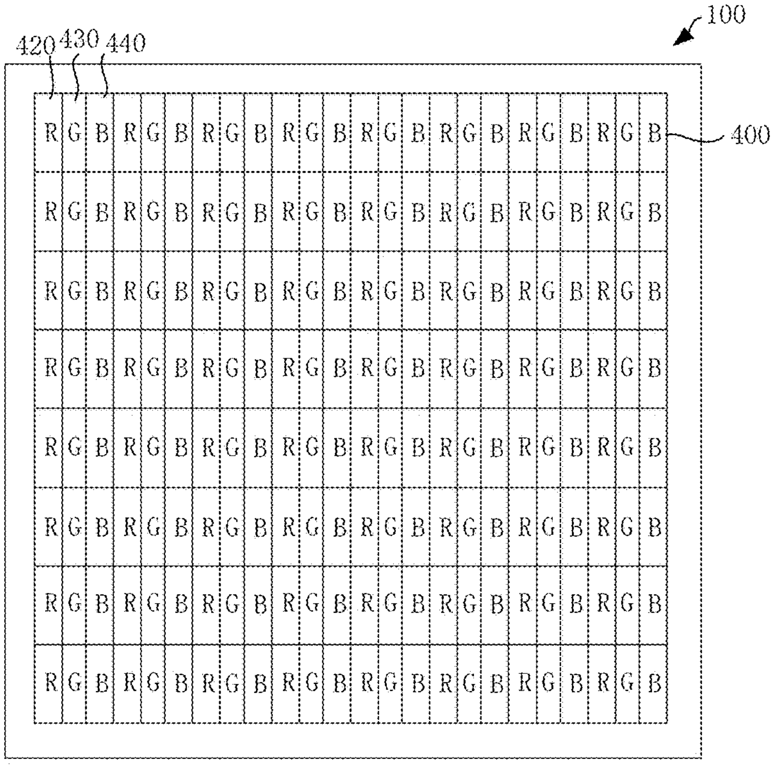
FIG. 7 is a schematic view of a light plate of a third embodiment of the present application.
Figure 8:
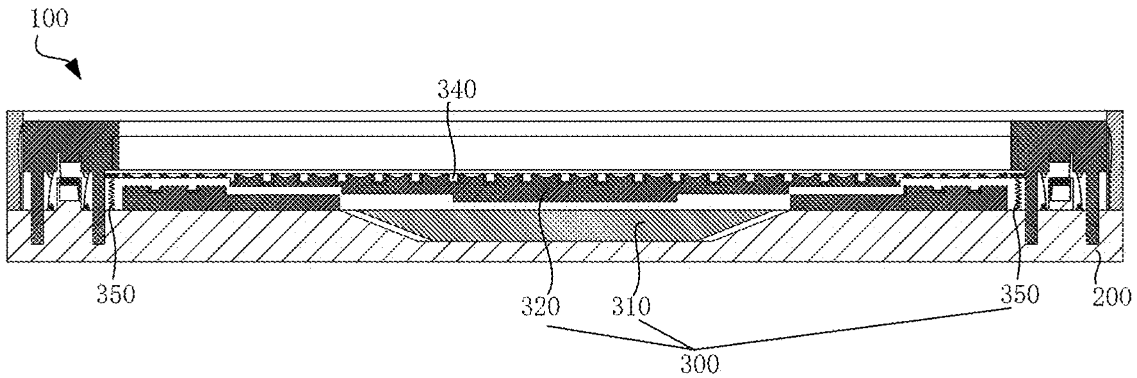
FIG. 8 is a schematic cross-sectional view of a light plate of the third embodiment of the present application.

As shown in FIG. 7 and FIG. 8, as a third embodiment of the present application, which is different from the above-mentioned embodiments, a light plate 100 is disclosed, which is applied to a display device. The display device is a Micro-LED display device. The light plate 100 includes a bottom plate 200, a vibration fitting assembly 300, and a plurality of light-emitting elements 400. The bottom plate 200 includes a first region located at the center and a second region located at the edge. The second region is arranged around the first region. The vibration fitting assembly 300 includes a vibrator 310, a vibration plate 320, and a plurality of supporting elastic pieces 350. The vibrator 310 is arranged in the first region. The plurality of supporting elastic pieces 350 are arranged in the second region. That is, the plurality of supporting elastic pieces 350 are arranged around the vibrator 310. The vibration plate 320 is arranged on the side of the vibrator 310 facing away from the bottom plate 200. The vibration plate 320 covers both the first region and the second region. The vibration plate 320 abuts against the plurality of supporting elastic pieces 350. A plurality of sets of installation slots 340 are disposed in the vibration plate 320. A positioning structure 410 matching a group of the installation slots 340 is arranged on each of the light-emitting elements 400. The light-emitting element 400 is installed in the respective group of installation slots 340 through the positioning structure 410. When the light-emitting elements 400 are laid on the vibration plate 320, the vibrator 310 is started to drive the vibration plate 320 to vibrate, thereby shaking the light-emitting elements 400, so that the light-emitting elements 400 gradually adjust their positions on the vibration plate 320 to be fit the positioning structure 410 of each light-emitting element 400 with the respective installation slots 340, thereby completing the installation of the light-emitting element 400.

In this embodiment, when installing light-emitting elements 400 on the light plate 100, the light-emitting elements 400 can be laid on the vibration plate 320 first. The light-emitting elements 400 can be laid on the vibration plate 320 at will, without considering the arrangement of the light-emitting elements 400 and whether there is overlap. Then the vibrator 310 is started to drive the light-emitting elements 400 on the vibration plate 320 to resonate, so that the light-emitting elements 400 gradually adjust their positions on the vibration plate 320, until the positioning structure 410 of each light-emitting element 400 is fitted with the corresponding installation slots 340 in the vibration plate 320, and so the installation of the light-emitting elements 400 on the light plate 100 is completed. When installing the light-emitting elements 400, the light plate 100 of this embodiment can realize the automatic assembly of the light-emitting elements 400 through the structure of the light plate 100 itself. That is, the vibrator 310 drives the light-emitting elements 400 to resonate so that the light-emitting elements 400 gradually adjust their positions to be installed at the designated positions, reducing the precision required for the mass transfer of the light-emitting elements 400 to the light plate 100, reducing the requirements for the mass transfer process of the Micro-LED, and eliminating the need for manual installation of the Micro-LED chips. The installation efficiency is high and the installation is accurate. Furthermore, the vibration fitting assembly 300 used to install the light-emitting elements 400 can be directly set on the light plate 100, without the need to set up other matching devices to make the light-emitting elements 400 vibrate to adjust their positions. In this embodiment, the vibrator 310 may be a sound unit. When assembling the light-emitting elements 400, the sound unit operates from a small frequency to a large frequency, so that the vibration plate 320 and the light-emitting elements 400 resonate, so that the light-emitting elements 400 gradually adjust their positions on the vibration plate 320 until the installation is completed. The sound unit can achieve precise and quantitative sound frequency to control the power density spectrum of the vibration, thereby achieving control of the vibration frequency. The supporting elastic pieces 350 elastically support the vibration plate 320, so that the vibration plate 320 and the vibrator 310 are spaced apart to avoid direct contact. It can be understood that the installation slot is provided with a power circuit for powering the respective light-emitting element to provide power to the respective light-emitting element.

Figure 9:
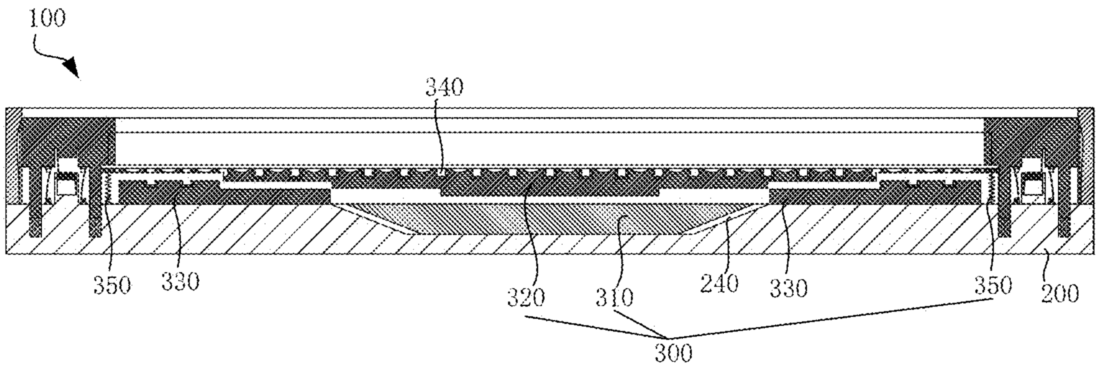
FIG. 9 is a schematic cross-sectional view of a light plate of a fourth embodiment of the present application.
Figure 10:
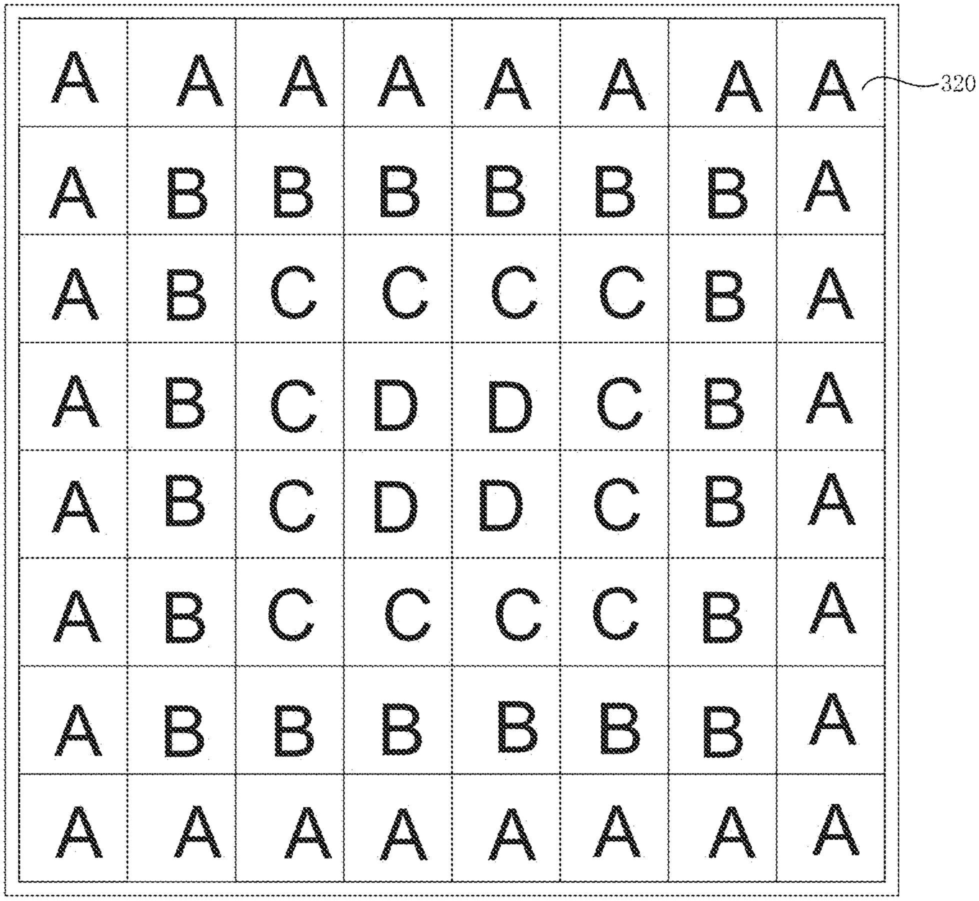
FIG. 10 is a schematic view of a vibration frequency of a vibration plate in the fourth embodiment of the present application.

As shown in FIG. 9, as a fourth embodiment of the present application, which is a further improvement of the third embodiment of the present application, a light plate 100 is disclosed. The light plate 100 further includes a support plate 330. The support plate 330 is arranged in the second region. The bottom plate 200 includes a groove 240. The vibrator 310 is arranged in the groove 240. In this way, the groove 240 is opened in the bottom plate 200, and the vibrator 310 is arranged in the groove 240 to reduce the thickness required for the light plate 100. At the same time, the vibration plate 320 is divided into areas with different vibration frequencies. The vibration plate 320 is arranged to be gradually thinned stepwise along the direction from the first region to the second region. The areas of the vibration plate 320 with different thicknesses have different vibration frequencies when vibrating. As shown in FIG. 10, the vibration frequency distribution on the vibration plate 320 is distributed in a descending order from A-D in the direction from the edge to the center. At the same time, the support plate 330 corresponding to the vibration plate 320 is disposed to be gradually thickened stepwise along the direction from the first region to the second region. In this way, after the light-emitting elements 400 are installed, when the vibration plate 320 and the support plate 330 are fitted, the light-emitting elements 400 disposed on the vibration plate 320 can be located at the same height. Furthermore, the support plate 330 can support the thinned area of the vibration plate 320, so that the vibration plate 320 will not break up. The vibration plate 320 is gradually thinned stepwise along the direction from the first region to the second region. When assembling the light-emitting elements 400, the vibrator 310 is started to drive the light-emitting elements 400 on the vibration plate 320 to vibrate. At this time, the vibration frequencies at different thickness positions on the vibration plate 320 are different, and the vibration frequency of the thinner area of the vibration plate 320 (i.e., the outer area of the vibration plate) is higher than the vibration frequency of the thicker area of the vibration plate 320 (i.e., the central area of the vibration plate). That is, the movement amplitude of a peripheral light-emitting element 400 will be greater than the movement amplitude of a central light-emitting element 400, so that the light-emitting elements 400 disposed on the vibration plate 320 are gradually assembled from the periphery to the center during assembly. In order to enable the vibration plate 320 to better receive the sound to generate resonance when the vibrator 310 is started, the inclination angle of the groove wall of the groove 240 is gradually expanded along the direction from the bottom plate 200 to the vibration plate 320, as shown in FIG. 9, so that when the vibrator 310 is started, the sound can be diffusely propagated to the vibration plate 320.

Specifically, the relationship between the vibration frequency on the vibration plate and the thickness of the vibration plate is expressed by the following formula:

$$h = \frac{PAI^2 K}{a^2 \text{ps}}$$

Where p is a density of the vibration plate, s is an area of the vibration plate, h is a thickness of the vibration plate, PAI is the π, K is a rigidity coefficient, a represents a sound frequency. It can be seen from the formula that when the sound frequency a is larger, the thickness h of the vibration plate is smaller. Therefore, the vibration frequency of the peripheral area of the vibration plate is higher than that of the central area of the vibration plate. In this embodiment, the vibration frequency of the peripheral area of the vibration plate to the vibration frequency of the central area of the vibration plate may be reduced in sequence. That is, the vibration frequency of the peripheral area of the vibration plate to the vibration frequency of the central area of the vibration plate can be decreased in the manner of 8*a* in area A, 6*a* in area B, 4*a* in area C, and 2*a* in area D. Furthermore, the thickness of the vibration plate gradually increases in steps from the peripheral area to the central area.

As shown in FIGS. 11 to 14, the light-emitting element 400 includes a first light-emitting chip 420, a second light-emitting chip 430, and a third light-emitting chip 440 arranged in sequence. The first light-emitting chip 420 may be a red chip (R). The second light-emitting chip 430 may be a green chip (G). The third light-emitting chip 440 may be a blue chip (B). The positioning structure 410 includes a first positioning piece 421 and a first conductive electrode 422 arranged on the first light-emitting chip 420, a second positioning piece 431 and a second conductive electrode 432 arranged on the second light-emitting chip 430, and a third positioning piece 441 and a third conductive electrode 442 arranged on the third light-emitting chip 440. Each group of the installation slots 340 includes a first positioning slot 341, a second positioning slot 342, a third positioning slot 343, a fourth positioning slot 344, a fifth positioning slot 345, and a sixth positioning slot 346. The first positioning slot 341 is fitted with the first positioning piece 421. The second positioning slot 342 is fitted with the first conductive electrode 422. The third positioning slot 343 is fitted with the second positioning piece 431. The fourth positioning slot 344 is fitted with the second conductive electrode 432. The fifth positioning slot 345 is fitted with the third positioning piece 441. The sixth positioning slot 346 is fitted with the third conductive electrode 442. The first positioning slot 341, the third positioning slot 343, and the fifth positioning slot 345 are arranged to be staggered from each other. The second positioning slot 342, the fourth positioning slot 344, and the sixth positioning slot 346 are arranged to be staggered from each other. It should be noted that a light-emitting chip may have two conductive electrodes. One conductive electrode is used for power input, and the other conductive electrode is used for power output to form a loop. Based on this, it can be understood that the first conductive electrode 422 can be provided in the number of two, the second conductive electrode 432 can be provided in the number of two, and the third conductive electrode 442 can be provided in the number of two. Accordingly, the corresponding second positioning slot 342, the fourth positioning slot 344, and the sixth positioning slot 346 are each provided in the number of two. When installing the light-emitting elements 400, the light-emitting elements 400 are spread on the vibration plate 320. Then, the vibrator 310 is started, driving the light-emitting elements 400 to vibrate on the vibration plate 320 to gradually move until the positioning structure 410 on the light-emitting element 400 is fitted with the respective installation slots 340 in the vibration plate 320 to complete the installation of the light-emitting elements 400. At the same time, the corresponding first positioning slot 341, third positioning slot 343, and fifth positioning slot 345 are staggered from each other, while the second positioning slot 342, fourth positioning slot 344, and sixth positioning slot 346 are staggered from each other, so that when the light-emitting element 400 are installed on the vibration plate 320, the installation direction of the light-emitting element 400 is correct, so that the positioning structure 410 of each light-emitting element 400 can be fitted with the installation slot 340 of the vibration plate 320 to complete the installation of the light-emitting elements 400.

Figure 11:
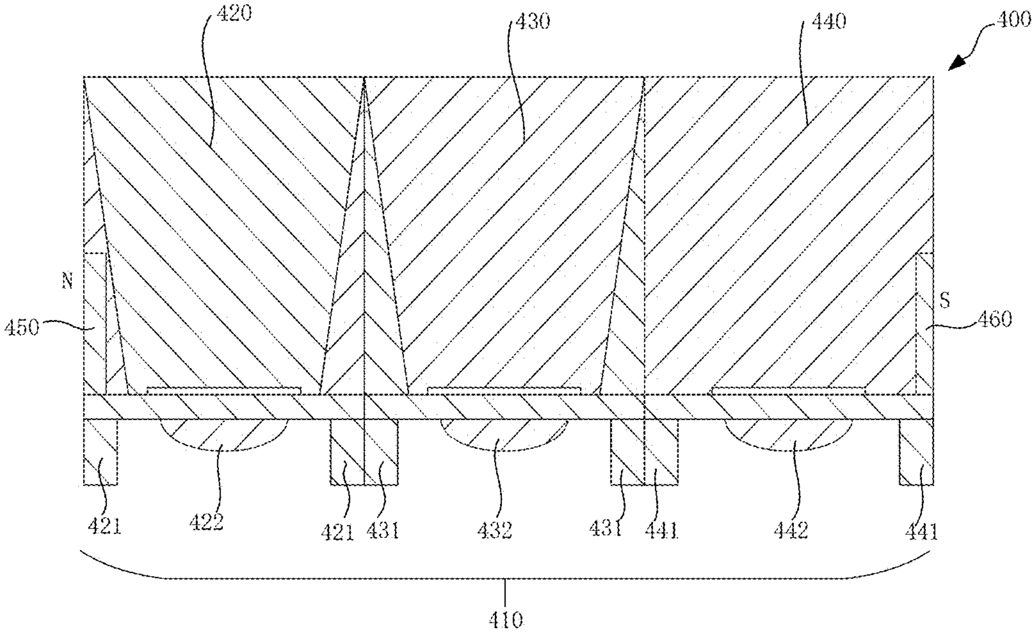
FIG. 11 is a schematic cross-sectional view of a light-emitting element in the fourth embodiment of the present application.
Figure 12:
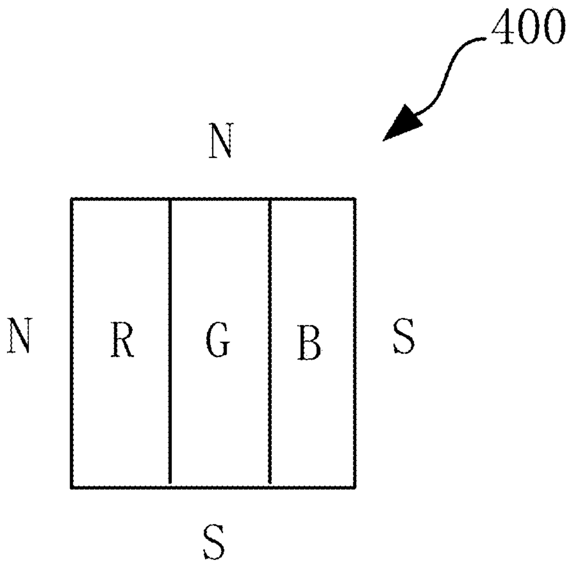
FIG. 12 is a magnetic diagram of a first positioning magnet and a second positioning magnet of the light-emitting element in the fourth embodiment of the present application.
Figure 13:
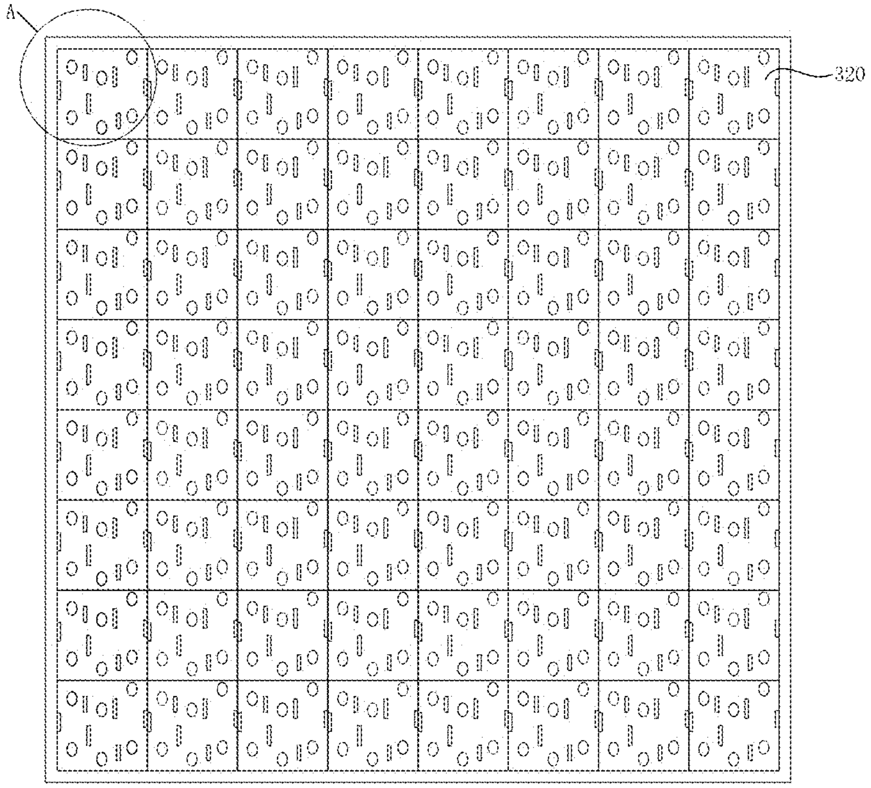
FIG. 13 is a schematic diagram of a vibration plate in the fourth embodiment of the present application.
Figure 14:
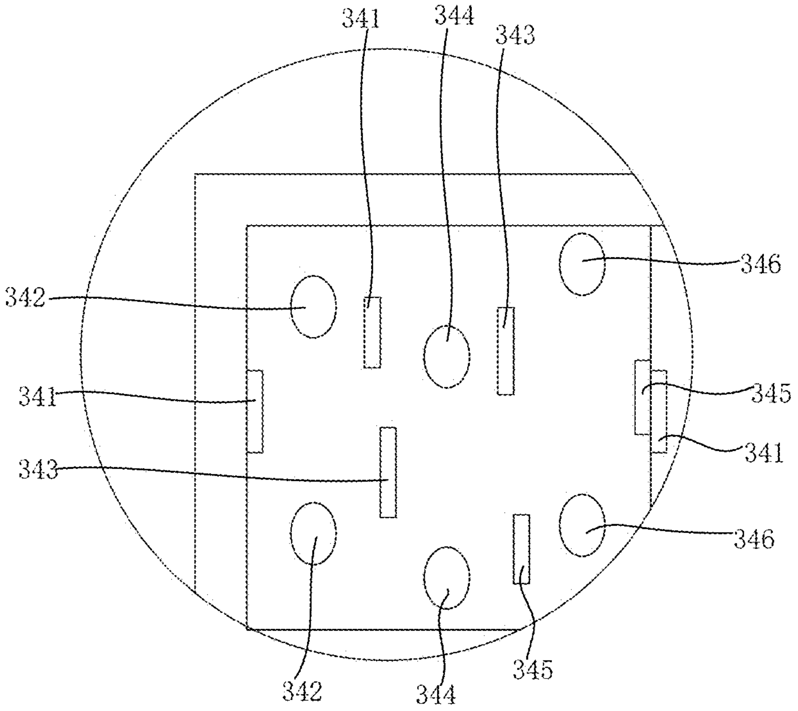
FIG. 14 is an enlarged view of portion A shown in FIG. 13 of the present application.

Further, as shown in FIG. 11 and FIG. 12, in order to improve the installation speed of the light-emitting elements 400, the light-emitting element 400 may be a cubic structure. A first positioning magnet 450 and a second positioning magnet 460 are respectively disposed on two opposite sides of the light-emitting element 400. The first positioning magnet 450 and the second positioning magnet 460 have opposite magnetic polarities. Two adjacent light-emitting elements 400 are fixed to each other by attracting each other through the first positioning magnet 450 and the second positioning magnet 460. In this way, when the light-emitting elements 400 are installed, when a light-emitting element 400 is installed, the adjacent light-emitting element 400 can rely on the attraction between the first positioning magnet 450 and the second positioning magnet 460 to be secured to the installation position. That is, when the light-emitting elements 400 are installed, the vibration frequency of the light-emitting element 400 located in the peripheral area of the vibration plate 320 is larger, and the movement amplitude of the light-emitting element 400 is larger. After the positioning structure 410 of the light-emitting element 400 is fitted with the installation slots 340 of the vibration plate 320, the position of the light-emitting element 400 will not change too much when the vibrator 310 continues to operate. Then the adjacent light-emitting element 400 can rely on the first positioning magnet 450 and the second positioning magnet 460 to attract each other to be secured to the installation position, so that the light-emitting elements 400 can be assembled from the peripheral area of the vibration plate 320 gradually toward the central area of the vibration plate 320. Furthermore, there is no gap between adjacent light-emitting elements 400 on the light plate 100 of this embodiment, so that smaller light-emitting elements 400 can be installed on the light plate 100, meeting the requirements of higher quality Micro-LED display devices. It can be understood that the magnetism of the first positioning magnet 450 may be the N pole, and the magnetism of the second positioning magnet 460 may be the S pole, or vice versa.

Figure 15:
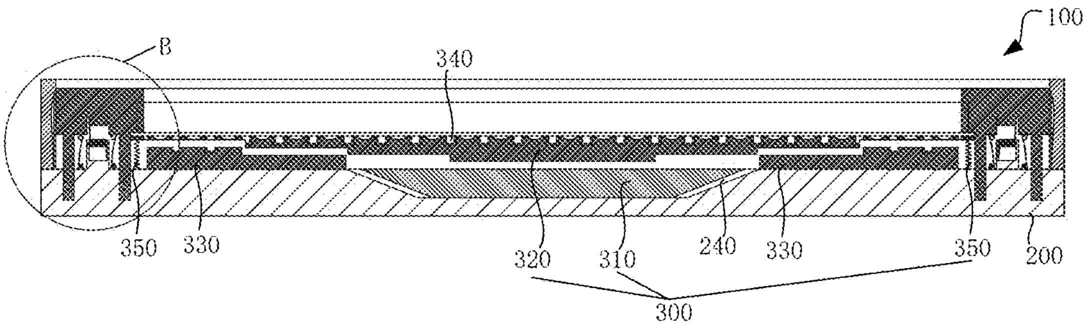
FIG. 15 is a cross-sectional schematic diagram of a light plate in the fifth embodiment of the present application.
Figure 16:
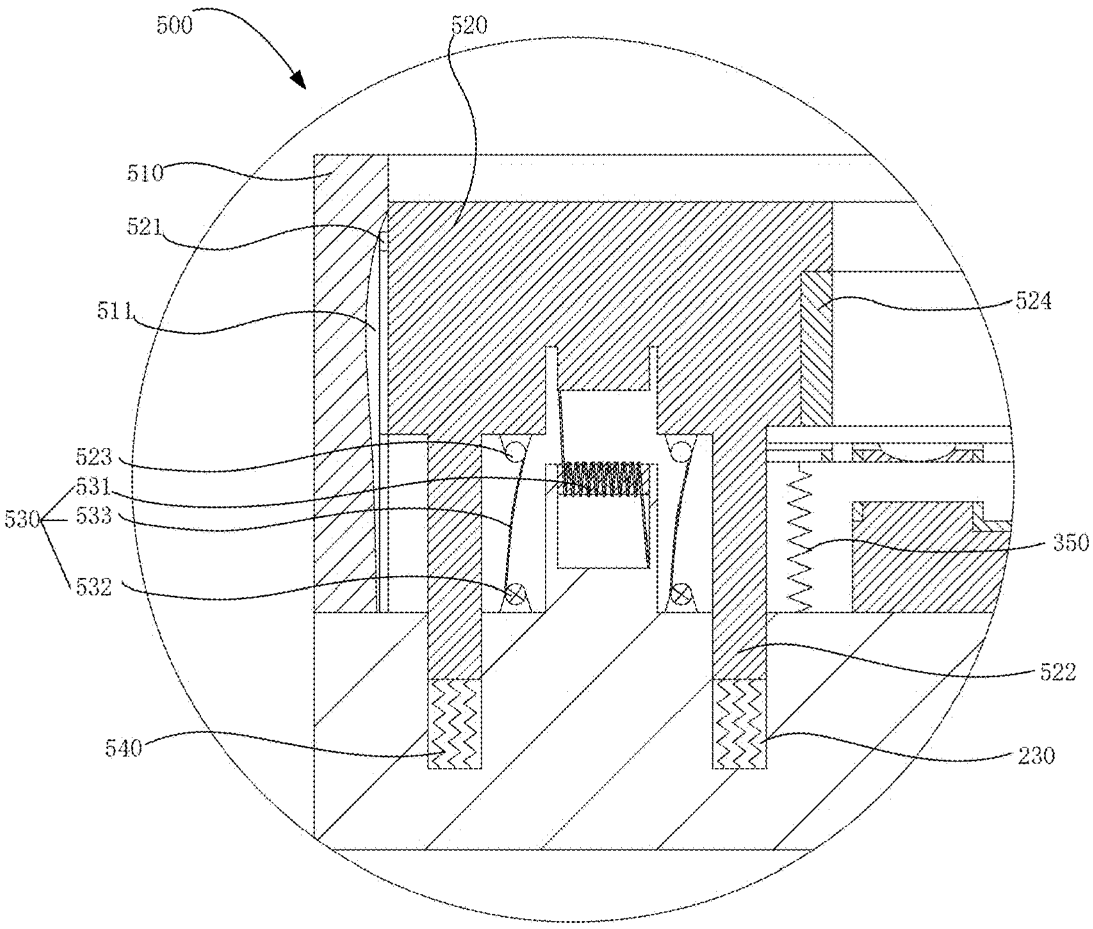
FIG. 16 is an enlarged view of portion B shown in FIG. 15 of the present application.

As shown in FIG. 15 and FIG. 16, as a fifth embodiment of the present application, a light plate 100 is disclosed. The light plate 100 further includes a retaining assembly 500 and a glass cover 110. The retaining assembly 500 is arranged in the second region. The bottom plate 200 includes a guide slot 230. The retaining assembly 500 includes a guide piece 510, a blocking piece 520, a displacement structure 530, and a first elastic piece 540. The guide piece 510 is fixed to the periphery of the bottom plate 200. The guide piece 510 defines a first slide groove 511 in one side facing the center of the bottom plate 200. The blocking piece 520 includes a slider 521 and a guide rod 522. The slider 521 cooperates with the first slide groove 511. The slider 521 can slide in the first slide groove 511. One end of the first slide groove 511 is arranged close to the bottom plate 200, and the other end is arranged away from the bottom plate 200. As shown in FIG. 16, the first elastic piece 540 is arranged in the guide slot 230. The guide rod 522 extends into the guide slot 230 and abuts against the first elastic piece 540. The displacement structure 530 is arranged between the blocking piece 520 and the bottom plate 200. The glass cover 110 is arranged on the side of the blocking piece 520 facing away from the bottom plate 200. The displacement structure 530 is activated to drive the blocking piece 520 to move close to the bottom plate 200. When assembling the light-emitting elements 400 on the light plate 100, when the vibrator 310 is started, since the guide rod 522 of the blocking piece 520 abuts against the first elastic piece 540, the blocking piece 520 will resonate with the vibration plate 320 when the vibrator 310 is operating, thereby preventing the light-emitting elements 400 from jumping out of the blocking piece 520 to a certain extent when vibrating on the vibration plate 320. The first elastic piece 540 may be a spring. The guide rod 522 is provided in the number of two. The displacement structure 530 is arranged between the two guide rods 522. The number of the guide slots 230 is provided to match the number of the guide rods 522.

Figure 18:
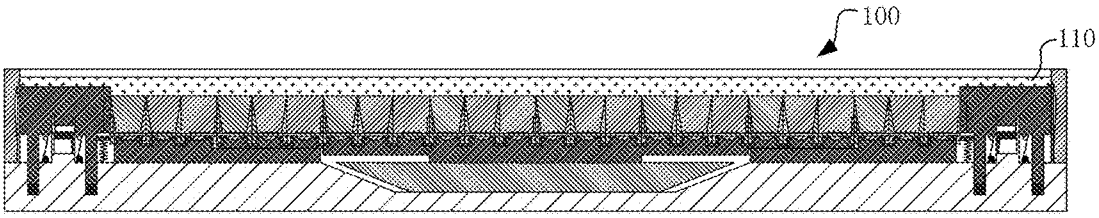
FIG. 18 is a schematic diagram of a light plate in the fifth embodiment of the present application after being fitted with a glass cover.

As shown in FIG. 16, the displacement structure 530 includes a torsion spring 531, a rotating shaft 532, and a winding belt 533. One end of the torsion spring 531 abuts against the blocking piece 520, and the other end abuts against the bottom plate 200. A fixing shaft 523 is disposed on the blocking piece 520. The rotating shaft 532 is disposed on the bottom plate 200. One end of the winding belt 533 is fixedly connected to the rotating shaft 532, and the other end is fixedly connected to the fixing shaft 523. When the rotating shaft 532 rotates, the winding belt 533 rolls and tightens to drive the blocking piece 520 including the fixing shaft 523 to move toward the bottom plate 200. Under the action of the bottom plate 200 and the blocking piece 520, the torsion spring 531 is compressed. At this time, the glass cover 110 moves toward the bottom plate 200. The glass cover 110 will first abut against the light-emitting elements 400, and press the light-emitting elements 400 tightly against the vibration plate 320. Then, the vibration plate 320 is pressed toward the bottom plate 200 until the vibration plate 320 abuts on the support plate 330, thereby completing the assembly of the light plate 100, as shown in FIG. 18. At this time, the supporting elastic piece 350 is compressed.

The rotating shaft 532 can be driven to rotate by setting a motor. The output shaft of the motor is connected to the rotating shaft 532 so that the rotating shaft 532 can realize the function of rotation. The designer can also use other methods to drive the rotating shaft 532 to rotate to retract the winding belt 533. The torsion spring 531 is disposed so that when the light-emitting elements 400 are not installed with the glass cover 110, that is, when the rotating shaft 532 does not retract the winding belt 533, the blocking piece 520 can maintain a constant relative distance from the bottom plate 200 under the support of the torsion spring 531. Even if the blocking piece 520 is pressed, the torsion spring 531 can restore the blocking piece 520 to its original position.

In this embodiment, after assembling the light-emitting elements 400 on the light plate 100, the glass cover 110 is then disposed on the blocking piece 520, that is, on the side of the blocking piece 520 facing away from the bottom plate 200. At this time, the slider 521 of the blocking piece 520 is located on the side of the first slide groove 511 facing away from the bottom plate 200. The rotating shaft 532 is then started to rotate the winding belt 533. The winding belt 533 is rolled and tightened to drive the blocking piece 520 with the fixing shaft 523 to move toward the bottom plate 200, and the first elastic piece 540 is gradually compressed. Under the compression of the bottom plate 200 and the blocking piece 520, the torsion spring 531 is also compressed. The slider 521 slides in the first slide groove 511 toward the side close to the bottom plate 200, and the glass cover 110 moves toward the bottom plate 200. The glass cover 110 will first abut on the light-emitting elements 400, and press the light-emitting elements 400 and the vibration plate 320 against each other. Then the vibration plate 320 is pressed toward the bottom plate 200 until the vibration plate 320 abut on the support plate 330. The rotating shaft 532 then stops rotating. The glass cover 110 presses the light-emitting elements 400 and the vibration plate 320, and so the assembly of the light plate 100 of this embodiment is completed. By using the glass cover 110 to press the light-emitting elements 400, the light-emitting elements 400 will not be displaced after assembly, which may otherwise cause poor installation. At the same time, by setting the retaining assembly 500 on the light plate 100 to install the glass cover 110, the glass cover 110 can be automatically installed in place by simply placing it on the blocking piece 520, without the need to use other encapsulating mechanisms or encapsulating machines to encapsulate the glass cover 110, which is very convenient. It should be noted that the light plate 100 may also use other structures of displacement structure 530 to realize the movement of the blocking piece 520, and it is only required to ensure that the blocking piece 520 moves in the direction of the bottom plate 200, which is however not to be repeatedly detailed herein again. Designers can choose the arrangement depending on actual conditions.

Further, as shown in FIG. 16, a third positioning magnet 524 is disposed on the side of the blocking piece 520 close to the vibration plate 320. The third positioning magnet 524 attracts the first positioning magnet 450 or the second positioning magnet 460 disposed on the light-emitting element 400. In this way, when assembling the light-emitting elements 400, when the vibrator 310 is started, the light-emitting elements 400 located in the peripheral area of the vibration plate 320 can each rely on the third positioning magnet 524 and its own first positioning magnet 450 or second positioning magnet 460 to attract each other, so as to speed up the assembly speed of the light-emitting elements 400. As such, the light-emitting elements 400 located in the peripheral area of the vibration plate 320 can each quickly fit the positioning structure 410 with the respective installation slots 340 of the vibration plate 320. Then the light-emitting elements 400 can be installed gradually from the outer area of the vibration plate 320 to the central area of the vibration plate 320. The third positioning magnet 524 may be bonded or fixedly connected to the blocking piece 520. Designers can choose the design depending on actual needs, which is however not to be elaborated here.

Figure 17:
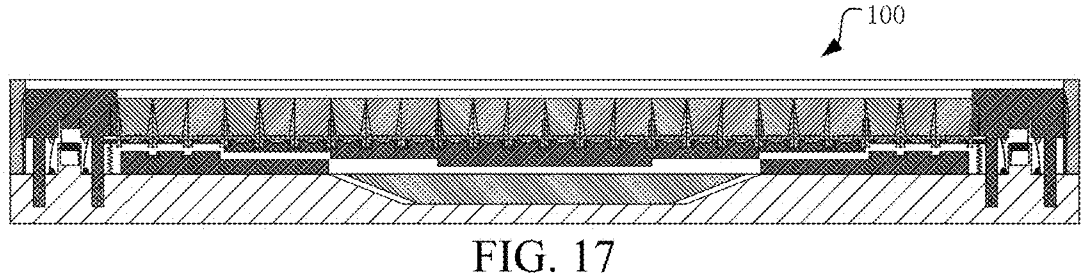
FIG. 17 is a schematic diagram of a light plate in the fifth embodiment of the present application after being fitted with a light-emitting element.

When assembling the light plate 100 of the present application, the light-emitting elements 400 are first laid on the vibration plate 320. The vibrator 310 is started to vibrate the vibration plate 320, driving the light-emitting elements 400 on the vibration plate 320 to vibrate so that the light-emitting elements 400 gradually move. The vibration frequency of the light-emitting elements 400 located at the edge of the vibration plate 320 is relatively large. The vibration frequency of the light-emitting elements 400 located at the center of the vibration plate 320 is relatively small. Under the action of the third positioning magnet 524, the light-emitting elements 400 located at the edge of the vibration plate 320 will be attracted to the third positioning magnet 524 when vibrating, so that the light-emitting elements 400 located at the edge of the vibration plate 320 are assembled first. Then, under the action of the first positioning magnet 450 and the second positioning magnet 460 of each light-emitting element 400, the installation process of the light-emitting elements 400 is gradually assembled from the edge of the vibration plate 320 to the center. After all the light-emitting elements 400 are installed, as shown in the state in FIG. 17, the positioning structure 410 of each light-emitting element 400 is fitted with the respective installation slots 340 of the vibration plate 320, and the glass cover 110 is installed. The glass cover 110 is disposed on the blocking piece 520, that is, on the side of the blocking piece 520 facing away from the bottom plate 200. Then the rotating shaft 532 is started to rotate and retract the winding belt 533. The winding belt 533 is rolled and tightened to drive the blocking piece 520 including the fixing shaft 523 to move toward the bottom plate 200, and the first elastic piece 540 is gradually compressed. Further, under the pressure of the bottom plate 200 and the blocking piece 520, the torsion spring 531 is also compressed. The slider 521 slides in the first slide groove 511 toward the side close to the bottom plate 200. The glass cover 110 gradually moves closer to the bottom plate 200 until the glass cover 110 is installed in place, when the rotating shaft 532 stops rotating. At this time, the glass cover 110 presses the light-emitting elements 400 tightly against the vibration plate 320 and the vibrator 310, as shown in FIG. 18, to complete the assembly of the light plate 100 of this embodiment. When assembling the light-emitting elements 400, since the third positioning magnet 524 and the first positioning magnet 450 or the second positioning magnet 460 can be attracted to each other to assist the installation of the light-emitting elements 400, the light-emitting elements 400 with a small size can be used, thereby meeting the requirements of a higher-quality Micro-LED display device. In addition, the vibration fitting assembly 300 used for the installation of the light-emitting elements 400 and the displacement structure 530 used for the installation of the glass cover 110 can be disposed in the light plate 100, without the need to set up other external devices to assist the installation, and the light-emitting elements 400 and the glass cover 110 can be assembled only by relying on the structure of the light plate 100 itself.

Figure 19:
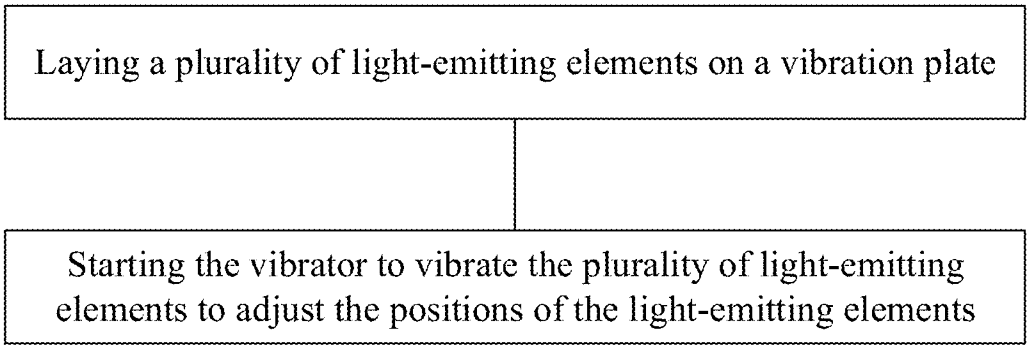
FIG. 19 is a flow chart of a light plate in a sixth embodiment of the present application.

As shown in FIG. 19, as a sixth embodiment of the present application, a method for assembling a plurality of light-emitting elements is disclosed, which is applied to the light plate described in the foregoing embodiments, and the assembly method includes the following operations:

laying a plurality of light-emitting elements on a vibration plate;

where specifically, the light-emitting elements can be laid irregularly on the vibration plate, and at this time, it is not required to consider the placement of the light-emitting elements on the vibration plate, and it is only required to ensure that each area on the vibration plate is laid with light-emitting elements, and the number of light-emitting elements in each area is uniform or close;

starting the vibrator, and the vibrator is started to vibrate the light-emitting elements to adjust the positions of the light-emitting elements;

where the positioning piece of each light-emitting element is fitted with the respective installation slot of the vibration plate to complete the installation of the light-emitting element.

Furthermore, the assembly method further includes the following operations:

placing a glass cover on the blocking piece;

starting the displacement structure to drive the blocking piece to move closer to the bottom plate to complete the installation of the glass cover;

where the glass cover presses the light-emitting elements tightly so that the light-emitting elements will not be displaced after assembly, thereby preventing poor installation.

When installing the light-emitting elements 400, the light plate 100 can realize the automatic assembly of the light-emitting elements 400 through the structure of the light plate 100 itself. That is, the vibrator 310 drives the light-emitting elements 400 to resonate so that the light-emitting elements 400 gradually adjust their positions to be installed at the designated positions. This reduces the precision required for the mass transfer of the light-emitting elements 400 to the light plate 100, reduce the requirements of the Micro-LED mass transfer process, and eliminates the need to use manpower to install the Micro-LED chips, so the installation efficiency is high and the installation is accurate. Furthermore, the vibration fitting assembly 300 used to install the light-emitting elements 400 can be directly set on the light plate 100, without the need to set up other matching devices to make the light-emitting elements 400 vibrate to adjust the positions.

Figure 20:
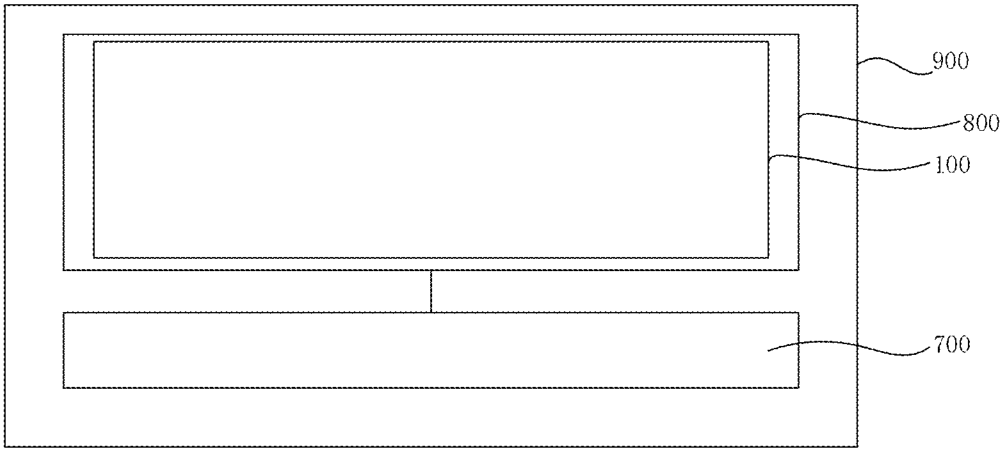
FIG. 20 is a schematic diagram of a display device in a seventh embodiment of the present application.

As shown in FIG. 20, as a seventh embodiment of the present application, a display device 900 is disclosed. The display device 900 includes a driving circuit 700 and a display panel 800. The display panel 800 includes a light plate 100 as described in the above embodiments. The driving circuit 700 drives the display panel 800. In the display device 900 of this embodiment, when installing the light-emitting elements 400, the light plate 100 can realize the automatic assembly of the light-emitting elements 400 through the structure of the light plate 100 itself. That is, the vibrator 310 drives the light-emitting elements 400 to resonate so that the light-emitting elements 400 gradually adjusts their positions to be installed at the designated position. The precision required for the mass transfer of the light-emitting elements 400 to the light plate 100 is reduced, the requirements for the mass transfer process of the Micro-LED are reduced, and the Micro-LED chip does not need to be installed manually, so that the installation efficiency is high and the installation is accurate. Furthermore, the vibration fitting assembly 300 used to install the light-emitting elements 400 can be directly disposed on the light plate 100, without the need to additionally provide other matching devices to allow the light-emitting elements 400 to vibrate to adjust their positions.

It should be noted that the limitations of the various steps involved in this solution are not to be interpreted to limit the order of the steps, under the premise of not affecting the implementation of the specific solution. The steps written earlier can be executed first, or later, or even at the same time with the steps written later. As long as this solution can be implemented, it should be regarded as falling in the scope of protection of this application.

It should be noted that the inventive concept of the present application can be formed into many embodiments, but the length of the application document is limited and so these embodiments cannot be enumerated one by one. Therefore, should no conflict be present, the various embodiments or technical features described above can be arbitrarily combined to form new embodiments. After the various embodiments or technical features are combined, the original technical effects may be enhanced.

The foregoing is a further detailed description of the present application with reference to some specific optional implementations, but it cannot be determined that the specific implementation of the present application is limited to these implementations. For those having ordinary skill in the technical field to which the present application pertains, several deductions or substitutions may be made without departing from the concept of the present application, and all these deductions or substitutions should be regarded as falling in the scope of protection of the present application.

What is claimed is:

1. A light plate applied to a display device, the light plate comprising:

a bottom plate, comprising a first region located in a center of the bottom plate and a second region located at an edge of the bottom plate, wherein the second region is arranged to surround the first region;

a vibration fitting assembly, comprising a vibrator, a vibration plate, and a plurality of supporting elastic pieces; wherein the vibrator is arranged in the first region; wherein the plurality of supporting elastic pieces are arranged in the second region; wherein the vibration plate is arranged on a side of the vibrator facing away from the bottom plate; wherein the vibration plate abuts against the plurality of supporting elastic pieces; and wherein the vibration plate defines a plurality of groups of installation slots;

a plurality of light-emitting elements, wherein each of the plurality of light-emitting elements comprises a positioning structure matching the respective group of installation slots; and wherein each of the plurality of light-emitting elements is installed in the respective group of installation slots through the positioning structure; and a retaining assembly, arranged in the second region; wherein the retaining assembly comprises a guide piece, a blocking piece, a first elastic piece, and a shaking structure; wherein there is defined a guide slot in the bottom plate; wherein the guide piece is fixedly arranged at a periphery of the bottom plate; wherein there is disposed a first slide groove in a side of the guide piece facing the center of the bottom plate; wherein there are arranged a slider and a guide rod on the blocking piece, wherein the slider is slidably fitted with the first slide groove; wherein the first elastic piece is arranged in the guide slot; wherein the guide rod extends into the guide slot and abuts against the first elastic piece; and wherein the shaking structure is arranged between the blocking piece and the bottom plate;

wherein when the plurality of light-emitting elements are laid on the vibration plate, the vibrator is started to drive the vibration plate to vibrate thereby shaking the plurality of light-emitting elements; wherein a vibration frequency of each light-emitting element located on the vibration plate comparatively nearer to the second region is greater than a vibration frequency of each light-emitting element located on the vibration plate comparatively nearer to the first region; wherein the shaking structure is operative to drive the blocking piece to vibrate with a vibration frequency of the vibration plate.

2. The light plate as recited in claim 1, further comprising a support plate disposed in the second region; wherein the support plate is disposed between the vibration plate and the bottom plate; wherein there is disposed a groove in the bottom plate, and wherein the vibrator is arranged in the groove; wherein the vibration plate is arranged to be gradually thinned stepwise in the direction pointing from the first region to the second region; wherein the support plate is arranged to be gradually thickened stepwise in the direction pointing from the first region to the second region; wherein the vibration plate is matched and fitted with the support plate;

wherein the shaking structure comprises a first shaking piece, a second shaking piece, a bearing piece, a second elastic piece, a third elastic piece, and two telescopic pieces arranged opposite to each other about a light emitting direction of the light plate; wherein the telescopic piece comprises a main body and an extension piece, wherein one end of the main body abuts against the bottom plate, and another end of the main body abuts against the blocking piece; wherein the extension piece is arranged on a side of the main body facing away from the guide rod; wherein there is disposed a second slide groove in the main body, and there is disposed a third slide groove in the extension piece; wherein the first shaking piece and the second shaking piece are arranged between the two telescopic pieces; wherein the first shaking piece is arranged adjacent to the bottom plate and slidably fitted with the second slide groove; wherein one end of the second elastic piece abuts against the bottom plate, and another end of the second elastic piece abuts against the first shaking piece; wherein the second shaking piece is arranged adjacent to the blocking piece and is slidably fitted with the third slide groove; wherein one end of the third elastic piece abuts against the extension piece, and wherein another end of the third elastic piece abuts against the second shaking piece; wherein the bearing piece is arranged on an end of the second shaking piece facing away from the first shaking piece; wherein an end of the bearing piece facing away from the second shaking piece abuts against the blocking piece; wherein there is arranged a vibration transmission medium between the first shaking piece and the second shaking piece;

wherein in response to the vibrator being started, the first shaking piece is operative to vibrate and further drive the second shaking piece to vibrate so that the bearing piece drives the blocking piece to vibrate.

3. The light plate as recited in claim 2, wherein the first shaking piece has a density that is equal to a density of a region of the vibration plate adjacent to the guide piece, so that a vibration frequency of the first shaking piece is identical with a vibration frequency of the region of the vibration plate adjacent to the blocking piece.

4. The light plate as recited in claim 2, wherein there is defined a first receiving slot in the bottom plate, and there is disposed a fourth elastic piece in the first receiving slot; wherein the shaking structure further comprises a third shaking piece disposed in the first receiving slot; wherein one end of the fourth elastic piece abuts against a bottom of the first receiving slot, and another end of the fourth elastic piece abuts against an end of the third shaking piece facing away from the blocking piece, wherein there is disposed a matching piece at an end of the first shaking piece facing away from the second shaking piece, wherein there is disposed an engaging piece matching the matching piece at an end of the third shaking piece facing towards the blocking piece;

wherein in response to the blocking piece moving toward the bottom plate until the matching piece is engaged with the engaging piece, the first shaking piece, the second shaking piece, and the third shaking piece all stop vibrating.

5. The light plate as recited in claim 2, wherein there is disposed a first sealing piece on an end of the first shaking piece facing towards the main body, wherein there is disposed a second sealing piece on an end of the second shaking piece facing towards the extension piece; wherein the first sealing piece and the second sealing piece are operative to seal the vibration transmission medium in between the first shaking piece and the second shaking piece.

6. The light plate as recited in claim 2, wherein the bearing piece comprises a fixing piece and a plurality of branches; wherein the fixing piece is fixedly connected to the second shaking piece; wherein one end of each of the plurality of branches is connected to the fixing piece, and wherein another end of the branch abuts against the blocking piece; wherein the plurality of branches are arranged in a triangular shape to support the blocking piece.

7. The light plate as recited in claim 2, wherein the first shaking piece has an area that is greater than an area of the second shaking piece.

8. The light plate as recited in claim 1, further comprising a glass cover, which is disposed on a side of the blocking piece facing away from the bottom plate.

9. The light plate as recited in claim 2, wherein the vibration transmission medium is a gas, the gas being carbon dioxide.

10. The light plate as recited in claim 1, wherein the vibrator is a sound generating unit, wherein when assembling the plurality of light-emitting elements, the sound generating unit is configured to operate in a plurality of frequencies in an ascending order to make the vibration plate and the plurality of light-emitting elements resonate.

11. The light plate as recited in claim 1, wherein each of the plurality of groups of installation slots comprises a power circuit for supplying power to the respective light-emitting element to provide power to the respective light-emitting element.

12. The light plate as recited in claim 2, wherein the main body comprises a first fixing piece and a first telescopic piece; wherein the first fixing piece is arranged adjacent to the bottom plate and abuts against the bottom plate; wherein the first telescopic piece is arranged adjacent to the blocking piece and abuts against the blocking piece; wherein the extension piece is arranged on a side of the first telescopic piece; wherein the first telescopic piece is retractable, and wherein when the first telescopic piece is retracted, the extension piece moves toward the bottom plate; wherein when the first telescopic piece is extended, the extension piece moves toward the blocking piece; and wherein the first telescopic piece is initially in an extended state.

13. The light plate as recited in claim 12, wherein the first telescopic piece is a telescopic cylinder so that when the first telescopic piece is contracted, an overall height of the first telescopic piece is reduced so that the first telescopic piece is contracted into its own structure.

14. The light plate as recited in claim 2, wherein the second elastic piece and the third elastic piece are each a compression spring.

15. The light plate as recited in claim 3, wherein the first shaking piece has a thickness that is equal to a thickness of a region of the vibration plate adjacent to the guide piece.

16. The light plate as recited in claim 4, wherein the engaging piece is a buckle, and the matching piece is a hook structure matching the buckle.

17. The light plate as recited in claim 5, wherein the first sealing piece and the second sealing piece are each a sealing gasket.

18. A display device, comprising a driving circuit and a display panel, wherein the display panel comprises a light plate, the light plate comprising:

a bottom plate, comprising a first region located in a center of the bottom plate and a second region located at an edge of the bottom plate, wherein the second region is arranged to surround the first region;

a vibration fitting assembly, comprising a vibrator, a vibration plate, and a plurality of supporting elastic pieces; wherein the vibrator is arranged in the first region; wherein the plurality of supporting elastic pieces are arranged in the second region; wherein the vibration plate is arranged on a side of the vibrator facing away from the bottom plate; wherein the vibration plate abuts against the plurality of supporting elastic pieces; and wherein the vibration plate defines a plurality of groups of installation slots;

a plurality of light-emitting elements, wherein each of the plurality of light-emitting elements comprises a positioning structure matching the respective group of installation slots; and wherein each of the plurality of light-emitting elements is installed in the respective group of installation slots through the positioning structure; and a retaining assembly, arranged in the second region; wherein the retaining assembly comprises a guide piece, a blocking piece, a first elastic piece, and a shaking structure; wherein there is defined a guide slot in the bottom plate; wherein the guide piece is fixedly arranged at a periphery of the bottom plate; wherein there is disposed a first slide groove in a side of the guide piece facing the center of the bottom plate; wherein there are arranged a slider and a guide rod on the blocking piece, wherein the slider is slidably fitted with the first slide groove; wherein the first elastic piece is arranged in the guide slot; wherein the guide rod extends into the guide slot and abuts against the first elastic piece; and wherein the shaking structure is arranged between the blocking piece and the bottom plate;

wherein when the plurality of light-emitting elements are laid on the vibration plate, the vibrator is started to drive the vibration plate to vibrate thereby shaking the plurality of light-emitting elements; wherein a vibration frequency of each light-emitting element located on the vibration plate comparatively nearer to the second region is greater than a vibration frequency of each light-emitting element located on the vibration plate comparatively nearer to the first region; wherein the shaking structure is operative to drive the blocking piece to vibrate with a vibration frequency of the vibration plate;

wherein the driving circuit is configured to drive the display panel.

19. The display device as recited in claim 18, wherein the light plate further comprises a support plate disposed on the second region; wherein the support plate is disposed between the vibration plate and the bottom plate; wherein there is disposed a groove in the bottom plate; wherein the vibrator is arranged in the groove; wherein the vibration plate is arranged to be gradually thinned stepwise in the direction pointing from the first region to the second region; wherein the support plate is arranged to be gradually thickened stepwise in the direction pointing from the first region to the second region; wherein the vibration plate is matched and fitted with the support plate;

wherein the shaking structure comprises a first shaking piece, a second shaking piece, a bearing piece, a second elastic piece, a third elastic piece, and two telescopic pieces arranged opposite to each other about a light emitting direction of the light plate; wherein the telescopic piece comprises a main body and an extension piece, wherein one end of the main body abuts against the bottom plate, and another end of the main body abuts against the blocking piece; wherein the extension piece is arranged on a side of the main body facing away from the guide rod; wherein there is disposed a second slide groove in the main body, and there is disposed a third slide groove in the extension piece; wherein the first shaking piece and the second shaking piece are arranged between the two telescopic pieces; wherein the first shaking piece is arranged adjacent to the bottom plate and slidably fitted with the second slide groove; wherein one end of the second elastic piece abuts against the bottom plate, and another end of the second elastic piece abuts against the first shaking piece; wherein the second shaking piece is arranged adjacent to the blocking piece and is slidably fitted with the third slide groove; wherein one end of the third elastic piece abuts against the extension piece, and wherein another end of the third elastic piece abuts against the second shaking piece; wherein the bearing piece is arranged on an end of the second shaking piece facing away from the first shaking piece; wherein an end of the bearing piece facing away from the second shaking piece abuts against the blocking piece; wherein there is arranged a vibration transmission medium between the first shaking piece and the second shaking piece;

wherein in response to the vibrator being started, the first shaking piece is operative to vibrate and further drive the second shaking piece to vibrate so that the bearing piece drives the blocking piece to vibrate.

20. The display device as recited in claim 19, wherein the first shaking piece has a density that is equal to a density of a region of the vibration plate adjacent to the guide piece, so that a vibration frequency of the first shaking piece is identical with a vibration frequency of the region of the vibration plate adjacent to the blocking piece.

* * * * *